United States Patent Office 3,521,756
Patented July 28, 1970

3,521,756
COALESCING VESSEL
Victor P. Kaminsky, Edmonton, Alberta, Canada, assignor of thirty percent each to Cities Service Athabasca, Inc., a corporation of Delaware, Imperial Oil Limited, a corporation of Canada, and Atlantic Richfield Corporation, a corporation of Pennsylvania, and ten percent to Royalite Oil Company, Limited, a corporation of Canada
Filed June 17, 1968, Ser. No. 737,573
Int. Cl. B01d 21/14, 21/16
U.S. Cl. 210—521                                   5 Claims

ABSTRACT OF THE DISCLOSURE

An apparatus for the mechanical coalescing of water from a froth of bitumen and water is disclosed herein. The apparatus comprises a vertical cylindrical open top tank divided into upper and lower compartments by a lower stationary baffle horizontally mounted at a fixed height above the tank bottom, and an upper stationary baffle horizontally mounted a similar height above the lower stationary baffle. The lower face of the upper stationary baffle and the upper face of the lower stationary baffle each have mounted thereon vertically extending pickets equidistantly spaced in rows of pickets, each row radiating outwards from the center of each of the baffles where a large central circular opening is located. The bottom of the tank has centrally located withdrawal ports with a support collar mounted above the ports, the support collar rotatably supporting a vertical shaft at the bottom end hereof. Attached to the shaft at a point between the upper and lower stationary baffle is a horizontal upper rotating baffle comprising a flat circular horizontal plate with vertically mounted teeth on its upper and lower sides. The teeth are equidistantly spaced in radially extending rows to pass between the plurality of pickets as the upper rotating baffle is rotated. A second flat, horizontal circular plate is mounted on the shaft at a point midway between the lower stationary baffle and the tank bottom and has mouned on each side, a plurality of flat vertical blades. A feed conduit mounted above the tank passes froth into the tank through its open end.

This invention relates to a vessel or tank used to coalesce water from a froth or an emulsion containing bitumen or hydrocarbon material and water. More particularly, this invention relates to an apparatus utilizing mechanical means for coalescing water from a froth containing hydrocarbon material and water obtained from the separation of an oil-water emulsion from a slurry of water, tar sand and bitumen.

Various mineral sources of petroleum type hydrocarbon material exist throughout the world. Besides coal, extensive quantities of hydrocarbon bearing ores such as shale oil and tar sand are located on the North American Continent. These materials have been continuously investigated as a source of synthetic crude oil, and interest in them at present is increasing. One of the proposed methods for economically obtaining a synthetic petroleum oil from both material sources is "in situ retorting," particularly for those deposits located under a large overburden. The other method involves removing the overburden, mechanically extracting the material from the ground, and then separating the hydrocarbon material from the other solids. The latter method has been principally applied to tar sands found in extensive deposits, particularly in the Athabasca River district of Alberta, Canada. The hydrocarbon material in the tar sand, generally denominated as bitumen, is separated from the tar sand by various water separation methods. The generally involve slurrying the tar sand in water, preferably hot water, and causing the bitumen to rise to the top of the water level as a froth or emulsion of hydrocarbon material and water. The froth which is removed from the separator requires further treatment to remove the entrapped water from the hydrocarbon material prior to subsequent conventional petroleum processing.

Various apparatus and processes have been proposed or adapted for accomplishing this objective. However, as always, there exists the need to more economically and efficiently remove as much as possible of the entrapped water from the hydrocarbon material before subjecting the hydrocarbon material to conventional petroleum type refining operations. As such, it is necessary to provide an efficient apparatus for separating the hydrocarbon material and water. It is felt that the water contained in the froth must first coalesce before it can efficiently be separated from hydrocarbon material, and thus it is necessary to develop processes and apparatus for efficiently coalescing water contained in such a froth.

I have therefore invented an apparatus for efficiently coalescing water from a froth of bitumen and water. The apparatus includes an open top tank having a withdrawal port in the bottom thereof, a means for feeding froth into the top of the tank at horizontal lower stationary baffle having a central opening, mounted above the bottom of the tank and forming a lower compartment, said lower stationary baffle having a plurality of upwardly extending pickets mounted on the top thereof and a horizontal upper, stationary baffle having a central opening, mounted above the lower baffle and forming an upper compartment, said upper stationary baffle having a plurality of downwardly extending pickets mounted on the bottom thereof. A vertical rotatable shaft is mounted in the tank and extends downwardly through the central openings in the stationary baffles. The vertical shaft has an upper rotating baffle comprising a horizontal plate attached to the shaft midway between the lower and upper stationary baffles, said plate having a plurality of vertical teeth mounted to intermesh with the pickets. A lower rotating baffle is also mounted on the shaft midway between the tank bottom and the lower stationary baffle and has a plurality of vertical extending blades mounted thereon. Means is provided for rotating the vertical shaft.

An object of this invention is to provide an improved apparatus for coalescing water from a froth containing hydrocarbon materials and water.

Another object of this invention is to provide an improved mechanical apparatus for separating water and hydrocarbon material in a froth.

Other objects and advantges of this invention will become apparent to those skilled in the art from the brief description of the drawings and description of the preferred embodiments which follows.

For a better understanding of the apparatus of this invention a set of drawings are included, a brief description of which is as follows.

Figure 1:
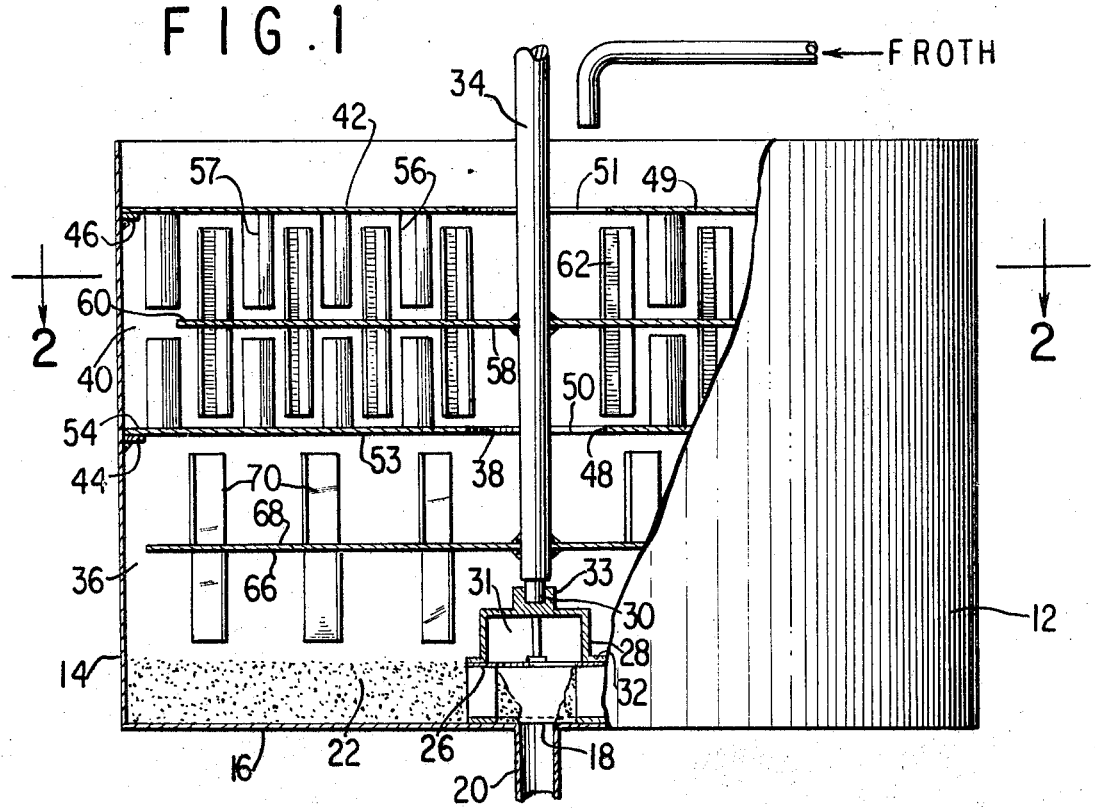
FIG. 1 is a cutaway elevation of the coalescing tank.
Figure 2:
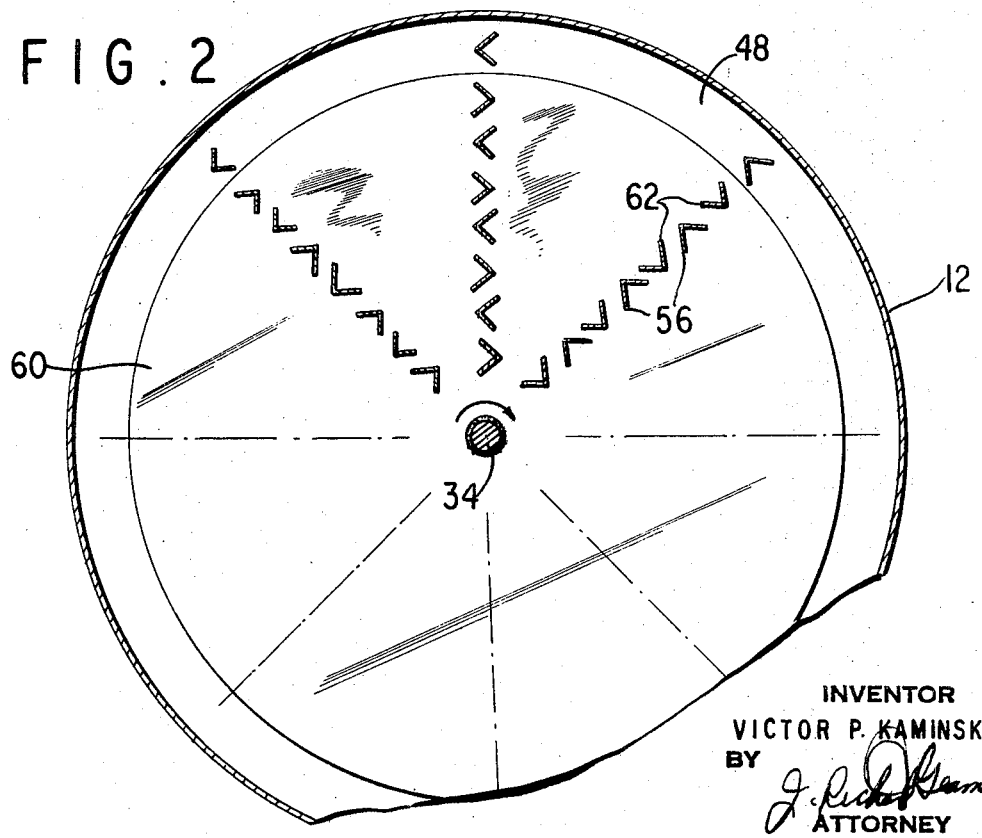
FIG. 2 is a view taken along section 2—2.

The coalescing apparatus is an upright or vertical cylindrical tank 12 generally having a greater diameter than height and formed of a metal cylindrical wall 14 and a circular bottom plate 16 attached to the bottom of the cylindrical wall 14. The bottom plate 16 has a centrally circular opening 18 through which a withdrawal conduit 20 extends. A concrete floor 22 covers the bottom plate 16 and extends up the cylindrical walls to a moderate height, e.g., about 5 inches, with the height of the concrete floor 22 being slightly higher at the outer edges than at the floor center where the withdrawal conduit 20 is located. The slight difference in height between the edges and the center of the concrete floor provides a moderate sloped floor surface towards the center of the tank 12.

A flat circular mounting flange 26 is attached to the concrete floor 22 and surrounds the withdrawal conduit opening 18 in the floor. A set of four equally spaced vertical uprights 28 are attached at their bottom ends to the circular flange 26 and at their upper ends to a vertical support collar 30. The bottom of the support collar 30, the sides of the uprights 28 and the top of the flange 26 together form four withdrawal ports 31 which permit transfer of materials from the tank into the withdrawal conduit. The collar 30 is formed of a flat base 32 and a circular vertical mounted tubular journal 33. A rotationally movable vertical shaft 34 is mounted on and supported by the journal 33 and has an axis which is coaxial with the axis of the cylindrical tank 12. The shaft 34 is undercut at its bottom to a smaller diameter than the journal 33 to which it is fitted so as to be able to rotate on a vertical axis.

The tank 12 is divided into two compartments, a lower compartment 36 formed by the concrete floor 22, the tank wall 14 and a lower stationary baffle 38, and an upper compartment 40, formed by the lower stationary baffle 38, the tank wall 14 and an upper stationary baffle 42. The lower stationary baffle 38 and the upper stationary baffle 42 are mounted respectively on a lower baffle support 44 and upper baffle support 46 and establish the top boundary of the lower compartment 36 and the top and bottom boundary of the upper compartment 40.

The stationary baffles 38 and 42 are similar in shape and are each formed of a flat circular plate 48 and 49 respectively, each having a large circular opening 50 and 51 respectively therethrough which provide substantial clearance for the vertical shaft 34 and the passage of fluid material. The respective stationary baffles 38 and 42 are fixedly mounted on their respective supports 44 and 46 by suitable means such as bolts or by welding.

A multiplicity of pickets 56 are fixedly mounted both to the top of the lower stationary baffle 38 and to the bottom of the upper stationary baffle 42 at locations directly opposite each other. The pickets 56 are vertically mounted angle irons fixedly mounted at one end to the respective side of each of the stationary baffles and equidistantly spaced in rows, with the cross-sectional apex 57 of the pickets pointed in a direction perpendicular to the axis of the row on which the angle iron pickets are located. When viewed from above the position in which the angle iron pickets are placed on both rings is such that their apices point in a counterclockwise direction.

An upper rotating baffle 58 is fixedly mounted to the shaft and extends radially outwards in the same horizontal plane from the shaft 34—a distance of at least that at which the outermost of the pickets 56 are located. The baffle 58 is fixedly attached to the shaft at a point midway between the lower rotating baffle 38 and the upper baffle 42.

The upper baffle 58 is constructed of a flat circular plate 60, on both sides of which a multiplicity of teeth 62 are vertically mounted. The teeth 62 are similar in shape to the pickets 56 and are formed from angle irons which are welded to both sides of the flat plate 60 at spaced intervals so as to be equidistantly spaced between the spaced pickets 56. The teeth 62 are welded to both sides of the plate with their apices pointed in a direction perpendicular to a longitudinal axis of their respective row and opposite to the direction of the apices of the pickets 56.

Similarly, a second lower rotating baffle 66 is mounted to the shaft 34 at a point midway between the tank floor 22 and the lower stationary baffle 38. The lower rotating baffle 66 is constructed of a flat horizontal plate 68 and has mounted thereon a plurality of upright blades 70 radiating outwardly in rows from the shaft 34. The blades 70 are flat metal bars which are mounted perpendicularly to the plate 68 at equidistantly spaced intervals, but with each side of the blades 70 making the same 45° angle with the longitudinal axis of each of the rows and with the blades 70 on the top of the plate 68 mounted perpendicularly to those mounted in the underside of the plate 68.

In operation, froth is fed into the top of the tank preferably towards the center of the tank and flows through the opening 51 in the upper stationary baffle 42 into the upper portion of the upper compartment above the upper rotating baffle 58. The rotation of the shaft with the concurrent rotation of the upper rotating baffle acting in concert with the stationary baffles continuously imparts a shearing action to the froth and acts to coalesce the water trapped in the froth. The stream of froth, hydrocarbon material and coalesced water flows over the upper rotating baffle 58 to the edge thereof and then flows back under the upper rotating baffle towards the center of the tank. The blades in the lower compartment act to impart a mixing action to the stream and tend to cause coalesced water droplets as they contact each other to further coalesce into larger volumes of water. The coalesced water and treated froth are passed out of the tank through the withdrawal conduit in the tank bottom for further processing such as by recycling or roller dewatering.

Having described the apparatus of my invention and wishing to cover those changes and modifications which are apparent to those skilled in the art without departing from the spirit and scope of my invention.

I claim:

1. An apparatus for coalescing water from a froth of hydrocarbon material and water, said apparatus comprising:

a tank;

means for feeding froth into the top of the tank;

means dividing the tank into at least two compartments, said means including an upper stationary baffle having a central opening therethrough horizontally mounted in said tank a spaced distance above the tank bottom, and a lower stationary baffle having a central opening therethrough mounted below said upper stationary baffle, said lower stationary baffle dividing the tank into two separate compartments, an upper and lower compartment;

a plurality of vertically extending pickets fixedly mounted to the underside of said upper stationary baffle and to the top of said lower stationary baffle;

a rotatable shaft coaxially mounted in said tank and extending through said compartments;

a rotatable baffle fixedly attached to the shaft and rotatable in a horizontal plane in the upper compartment;

a plurality of vertically extending teeth mounted on said rotatable baffle and positioned to intermesh with said vertical extending pickets;

means for rotating said shaft; and means in said tank for withdrawing coalesced water and treated froth.

2. The apparatus of claim 1 in which the upper rotatable baffle is a flat circular plate.

3. The apparatus of claim 2 which additionally comprises a lower rotating baffle fixedly attached to the shaft and rotating in a horizontal plane in the middle of said lower compartment.

4. The apparatus of claim 2 wherein said pickets are vertically mounted angle irons, said angle iron pickets and said angle iron teeth each having apices directed perpendicular to a diameter drawn through each of the baffles and 180° apart from each other.

5. The apparatus of claim 4 which additionally comprises a lower rotating baffle fixedly attached to the shaft and rotating in a horizontal plane in the middle of said lower compartment, said lower rotating baffle comprising a flat horizontal circular plate having a plurality of vertically extending blades mounted on each side thereof.

References Cited

UNITED STATES PATENTS

| | | | |
|---|---|---|---|
| 2,162,281 | 6/1939 | Ledbetter | 210—219 X |
| 2,179,246 | 11/1939 | Applebaum | 210—208 |
| 3,032,403 | 5/1962 | Kohl | 210—521 X |

JAMES L. DeCESARE, Primary Examiner

U.S. Cl. X.R.

210—528